June 4, 1968 J. F. TAPLIN 3,386,345
ROLLING DIAPHRAGM DEVICE HAVING CENTERING BUTTON ON DIAPHRAGM
AND HAVING PISTON ROD ROTATABLE RELATIVE TO PISTON
Filed Aug. 1, 1966
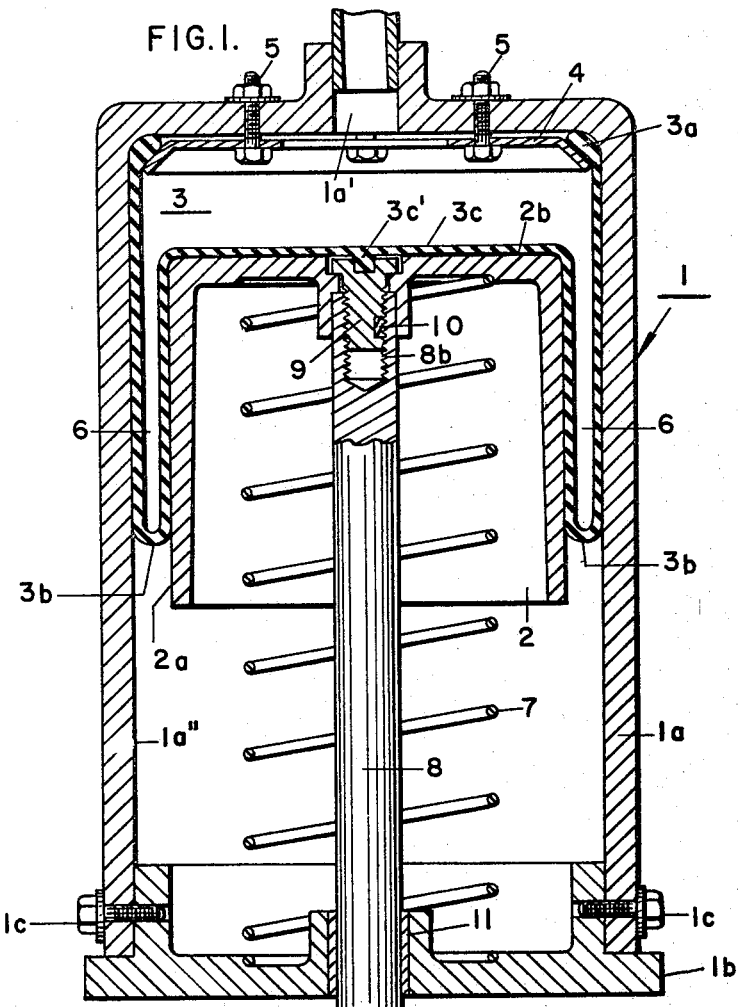
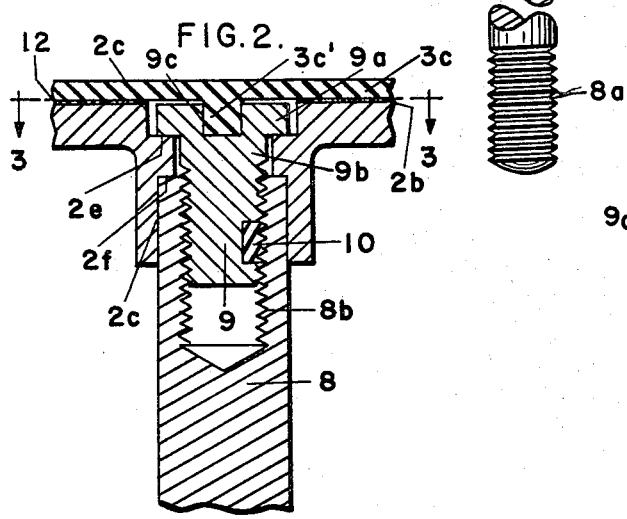
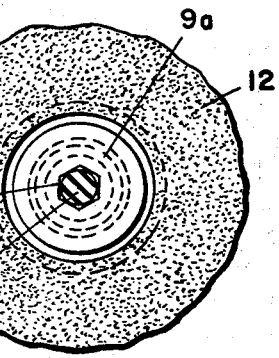
INVENTOR:
JOHN F. TAPLIN,
BY [signature]
ATTORNEY United States Patent Office 3,386,345
Patented June 4, 1968

3,386,345
ROLLING DIAPHRAGM DEVICE HAVING CENTERING BUTTON ON DIAPHRAGM AND HAVING PISTON ROD ROTATABLE RELATIVE TO PISTON
John F. Taplin, 15 Sewall St.,
West Newton, Mass. 02165
Filed Aug. 1, 1966, Ser. No. 569,393
5 Claims. (Cl. 92—99)

ABSTRACT OF THE DISCLOSURE

A rolling diaphragm device is provided with diaphragm centering means including a screw securing the piston rod to the piston whose head is flush with the end surface of the piston and defines a recess coaxial with the piston engaged by a projection integral with the radially inner circular portion of the rolling diaphragm. The piston rod is mounted for relative rotation with respect to the piston.

This invention relates to rolling diaphragm devices as used, for instance, as linear positioners or linear actuators, as piston pumps, and for many other purposes.

It is a general object of this invention to provide greatly improved rolling diaphragm devices.

Rolling diaphragm devices include a cylinder body having an inner lateral wall which is cylindrical in shape, and a piston having an outer lateral wall which is also cylindrical in shape but has a smaller diameter than the inner lateral wall of the cylinder body. The piston has further an end surface which is generally flat. The device further includes a rolling diaphragm which has a radially outer portion fixedly secured to said cylinder body, a substantially U-shaped rolling wall arranged between said inner lateral wall of said cylinder body and said outer lateral wall of said piston, and a radially inner portion fixedly secured to the end surface of the piston.

While there are many types of rolling diaphragms in existence, those including an insert of a woven material and a skin or layer of an elastomer are generally preferable when the stroke of the piston is relatively long, as is very often necessary, or desirable. Such composite woven-insert-and-elastomer-layer rolling diaphragms are disclosed and claimed in U.S. Patent 2,849,026, issued Aug. 26, 1958, to John F. Taplin, for Flexible Fluid Sealing Diaphragm, and reference may be had to that patent for further information in regard to this preferred form of rolling diaphragms.

One of the limitations, or drawbacks, of prior art rolling diaphragms is the difficulty involved in properly aligning the axis of the rolling diaphragm with the common axis of the cylinder body and of the piston. A misalignment of the three common axes results in malfunctioning of the rolling diaphragm device, and in a drastic reduction of the life of the rolling diaphragm proper.

It is, therefore, an object of this invention to provide improved rolling diaphragm devices which make it readily possible to properly align the rolling diaphragm with the cylinder body and the piston, and to thus preclude malfunctioning of the device, and reduction of the life of its rolling diaphragm.

As a general rule, the radially inner portion, or radially inner clamping flange, of a rolling diaphragm is secured to the end surface of the piston of the rolling diaphragm device by means of a circular clamping plate, or retainer plate, and of screw-threaded studs, projecting transversely through the clamping or retainer plate and through the radially inner portion or clamping flange of the rolling diaphragm into the piston of the rolling diaphragm device. This way and similar ways of securing a portion of a rolling diaphragm to a piston results in the formation of perforations in the diaphragm which may result in leakage of fluid through these perforations.

It is, therefore, another object of this invention to provide rolling diaphragm devices which are not subject to the drawbacks and limitations of the aforementioned prior art rolling diaphragm devices, and do not include a clamping or retainer plate nor studs projecting through a portion of the rolling diaphragm establishing potential leakage paths.

The removal of the aforementioned clamping plate or retainer plate incident to replacement of a rolling diaphragm is a relatively time-consuming maintenance operation.

It is, therefore, another object of this invention to provide rolling diaphragm devices which make it possible to replace the rolling diaphragm thereof in a much easier way, and in a less time consuming way, than in prior art rolling diaphragm devices.

In rolling diaphragm devices it is often necessary to freely rotate the shaft, or piston rod, about the axis common to the shaft, or piston rod, and the piston, without transmitting any torque from the shaft, or piston rod, to the piston and to the rolling diaphragm which is attached to the latter. If the rolling diaphragm device is intended to be used as a linear actuator, or positioner, for another device, the said device must be mechanically coupled to the shaft, or piston rod, of the rolling diaphragm device. Such coupling can most readily be achieved by means of a screw-thread on one end of the shaft, or piston rod, of the rolling diaphragm device, provided that the shaft, or piston rod, can be rotated relative to the piston without transmitting any torque to the latter.

It is, therefore, another object of this invention to provide rolling diaphragm devices including means of utmost simplicity allowing relative rotation of the shaft, or piston rod, and the piston, without transmission of any torque between these two parts.

Further objects and advantages of the invention will become apparent from the ensuing description thereof, and the features of novelty which characterize the invention will be pointed out with particularity in the claims annexted to, and forming part of, this specification.

For a better understanding of the invention reference may be had to the accompanying drawings wherein:

FIG. 1 is substantially a longitudinal vertical section of a rolling diaphragm device embodying this invention, some of the constituent parts thereof being shown in front view rather than in section;

FIG. 2 is a detail of the structure of FIG. 1 shown on a considerably larger scale than FIG. 1; and FIG. 3 is a section along 3—3 of FIG. 2.

Referring now to the drawings, numeral 1 has been applied to generally indicate a cylinder body including bonnet 1a and base 1b. Screws 1c project transversely through bonnet 1a and base 1c and integrate parts 1a, 1b to form a structural unit. Bonnet 1a defines passageway 1a' for admitting fluid into cylinder body 1, or for draining fluid from cylinder body 1, respectively. Reference numeral 1a'' has been applied to indicate the inner lateral cylinder-shaped wall of bonnet 1a. Piston 2 is arranged inside of cylinder body 1 in coaxial relation thereto. The outer lateral cylinder-shaped wall 2a of piston 2 has a smaller diameter than the inner lateral wall 1a'' of bonnet 1a. Thus the lateral walls 1a'' and 2a define a toroidal gap space 6 in any position of piston 2. FIG. 1 shows piston 2 near the end of its up-stroke. Piston 2 has a flat circular end surface to which reference character 2b has been applied. Reference character 3 has been applied to generally indicate a composite woven-insert-and-elastomer-layer rolling diaphragm. The latter includes a radially outer portion or beam 3a held in position by a retainer plate 4 which is secured by means of screws and nuts 5 to the head of bonnet 1a. Rolling diaphragm 3 includes the rolling wall 3b which is substantially U-shaped in cross-section and arranged inside the toroidal gap space 6 bounded by lateral walls 1a″, 2a. The rolling diaphragm 3 further includes the radially inner circular portion 3c which is coextensive with the circular end surface 2b of piston 2. Piston 2 is under the action of a helical biasing spring 7 whose upper end rests against and abuts against piston 2, and whose lower end rests against and abuts against base 1b. Piston 2 is provided with a bore 2c forming a first shoulder 2e and a second shoulder 2f. The lower portion of bore 2c receives a piston rod, or shaft, 8 which is externally screw-threaded at 8a, i.e. at the end remote from piston 2. The upper end of piston rod, or shaft, 8 forms an abutment cooperating with, or abutting against, shoulder 2f. The upper end of shaft, or piston rod, 8 is internally screw-threaded as indicated at 8b. Reference numeral 9 has been applied to indicate a screw or screw-threaded fastener rod whose lower screw-threaded end engages cooperatively the internal screw thread 8b in piston rod 8. The head 9a of screw 9 overlaps shoulder 2e and there is a small clearance (not shown) between the lower surface of screw head 9a and shoulder 2e. This clearance may be in the order of .001″ to .003″. There is also a radial clearance between bore 2c and the screw head 9a and a radial clearance between the upper non-threaded portion 9b of the shaft of screw 9. As a result, screw 9 which is arranged in coaxial relation to cylinder body 1, piston 2 and piston rod, or shaft, 8 is free to rotate relative to piston 2 about the common longitudinal axis thereof. Screw head 9a is flush with the end surface 2b of piston 2 and has a hexagonal recess 9c adapted to receive the end of an Allen wrench for operating screw 9. A portion of the shaft of screw 9 situated between the ends thereof is provided with a recess accommodating friction block 10. Friction block 10 is made of a plastic material whose outer surface engages tightly and under considerable friction the internal screw thread 8b in shaft 8 and thus tends to preclude relative rotation of shaft 8 and screw 9 about the common geometrical axis thereof. The center of the radially inner circular portion 3c of rolling diaphragm 3 is provided with a button, or projection, 3c′ which is circular in cross-section. The lateral sides of hexagonal recess 9c in screw head 9a engage substantially tangentially the centering button, or projection, 3c′ of rolling diaphragm 3 and thus effect a precise coaxial alignment of rolling diaphragm 3, piston 2 and cylinder body 1. The coextensive circular surface 2b of piston 2 and 3c of rolling diaphragm 3 are bonded to each other by a thin layer of an appropriate cement to which numeral 12 has been applied. The particular cement selected depends upon the elastomer with which rolling diaphragm 3 is impregnated, or which forms the fluid impermeable skin thereof. The lower end of piston rod, or shaft, 8 rests in a slide bearing 11 integral with base 1b.

The centering projection 3c′ is formed jointly with the rolling diaphragm 3 in the diaphragm-forming fixture, or mold. As a result, its location is absolutely uniform and assures a perfect centering, or alignment, of diaphragm 3 relative to piston 2.

It will be understood that in the absence of part 10 a certain relatively small torque would be required for effecting relative rotation of screw 9 and shaft 8, this torque depending upon the friction between the threads of screw 9 and those of shaft 8. The presence of part 10 greatly increases the torque required for relative rotation of parts 8 and 9. If and when shaft 8 is rotated for the purpose of screwing its thread into a device operated by the rolling diaphragm device, or operating the rolling diaphragm device, shaft 8 and screw 9 rotate jointly as a structural unit, while projection 3c′ of rolling diaphragm 3 remains at rest inside of recess 9c of screw 9.

During the downward stroke of piston 2 the rolling wall 3b rolls off piston 2 onto the surface 1a″, and during the upward stroke of piston 2 the rolling wall 3b rolls off the surface 1a″ onto the surface 2a.

It will be understood that the novelty of the device does not consist in its mode of operation as such, but in the improvement of its operation due to better centering of the rolling diaphragm 3, its increased useful life resulting from better centering of the diaphragm, and avoidance of any perforations therein, and in the drastic reduction of cost of maintenance and assembly resulting from the structural features which have been described above.

It will be understood that I have illustrated and described herein a preferred embodiment of the invention, and that various alterations may be made in the details thereof without departing from the spirit and scope of the invention as defined in the appended claims.

I claim as my invention:

1. A rolling diaphragm device including:
   (a) a cylinder body having an inner lateral wall;
   (b) a piston having an outer lateral wall arranged in coaxial relation to and inside of said cylinder body and having an end surface, the end surface of said piston having a recess in the center thereof;
   (c) a piston rod arranged in coaxial relation to said cylinder body and to said piston;
   (d) a rolling diaphragm having a radially outer portion fixedly secured to said cylinder body, a substantialy U-shaped rolling wall arranged between said inner lateral wall of said cylinder body and said outer lateral wall of said piston and a radially inner circular portion in abutting relation to and coextensive with said end surface of said piston and secured to said end surface of said piston, said radially inner circular portion of said rolling diaphragm having a projection integral with said radially inner circular portion of said rolling diaphragm and arranged in the center thereof; and
   (e) a screw projecting transversely through said end surface of said piston into said piston rod, securing said piston rod to said piston, said screw including a screw-head arranged inside said recess in said end surface of said piston and flush with said end surface, of said piston, and said screw-head defining a recess coaxial with said piston and engaged by said projection on said radially inner circular portion of said rolling diaphragm.

2. A rolling diaphragm device as specified in claim 1 wherein said projection on said radially inner circular portion of said rolling diaphragm is circular in cross-section, and wherein said recess in said screw-head of said screw is polygon-shaped in cross-section, the lateral sides of said recess in said screw-head of said screw tangentialy engaging the lateral side of said projection on said radially inner circular portion of said rolling diaphragm.

3. A rolling diaphragm device including
   (a) a cylinder body having an inner lateral wall;
   (b) a piston having an outer lateral wall arranged in coaxial relation to and inside of said cylinder body and having an end surface;
   (c) a piston rod arranged in coaxial relation to said cylinder body and to said piston;
   (d) a rolling diaphragm having a radially outer portion fixedly secured to said cylinder body, a substantially U-shaped rolling wall arranged between said lateral wall of said cylinder body and said outer lateral wall of said piston and a radially inner circular portion in abutting relation to and coextensive with said end surface of said piston, said radially inner circular portion of said rolling diaphragm having a projection integral with said radially inner portion of said rolling diaphragm and arranged in the center thereof; and
   (e) a fastener for said piston rod projecting transversely through said end surface of said piston, said fastener being arranged coaxial to said piston and loosely mounted in said piston to allow relative rotation of said fastener and said piston, said fastener having an end adjacent the end surface of said piston and an end remote from said end surface of said piston, said end of said fastener adjacent said end surface of said piston being flush with said end surface of said piston and defining a recess coaxial with said piston and engaged by said projection on said radially inner circular portion of said rolling diaphragm, and said end of said fastener remote from said end surface of said piston including means for securing said fastener to said piston rod and precluding relative rotation of said fastener and said piston rod.

4. A rolling diaphragm device including:
(a) a cylinder body having an inner lateral wall;
(b) a piston having an outer lateral wall arranged in coaxial relation to and inside of said cylinder body and having an end surface;
(c) a rolling diaphragm having a radially outer portion fixedly secured to said cylinder body, a substantially U-shaped rolling wall arranged between said inner lateral wall of said cylinder body and said outer lateral wall of said piston and a radially inner portion secured to said end surface of said piston, said piston having a central passageway defining a shoulder portion;
(d) a piston rod arranged in coaxial relation to said piston and having one end projecting into said passageway thereof;
(e) a fastener rod for said piston rod, said fastener rod having a shoulder portion overlapping said shoulder portion defined by said central passageway of said piston and said fastener rod being freely rotatable relative to said piston about the longitudinal axis thereof;
(f) an external screw-thread on said fastener rod cooperatively engaging an internal screw-thread in said piston rod;
(g) means for increasing the torque required for relative rotation of said fastener rod and said piston rod beyond the torque required for relative rotation of said fastener rod and said piston rod as a result of the frictional engagement of said external screw-thread on said fastener rod and said internal screw-thread on said piston rod; and
(h) a pair of cooperating abutment shoulders on said piston and on said piston rod for precluding relative movement of said piston and of said piston rod in a direction longitudinally thereof.

5. A rolling diaphragm device as specified in claim 4, wherein one end of said fastener rod is flush with said end surface of said piston and defines a recess coaxial with said piston, and wherein said radially inner portion of said rolling diaphragm is circular and has an integral projection of an elastomer in the center thereof engaging said recess in said fastener rod.

References Cited
UNITED STATES PATENTS

| | | | |
|---|---|---|---|
| 2,318,119 | 5/1943 | Westhaver | 287—91 |
| 2,539,887 | 1/1951 | Boots | 151—7 |
| 2,654,561 | 10/1953 | Trefil | 92—99 X |
| 2,748,797 | 6/1956 | Heizer et al. | 92—99 X |
| 2,849,026 | 8/1948 | Taplin | 92—103 |
| 2,988,353 | 6/1961 | Dietrich | 92—99 X |
| 3,075,499 | 1/1963 | Prather | 92—99 X |
| 3,273,470 | 9/1966 | Bradley | 92—101 |
| 3,289,550 | 12/1966 | Watson | 92—99 |
| 3,311,028 | 3/1967 | Taplin | 92—99 |

FOREIGN PATENTS

| | | |
|---|---|---|
| 904,006 | 8/1962 | Great Britain. |

EDGAR W. GEOGHEGAN, *Primary Examiner.*

MARTIN P. SCHWADRON, *Examiner.*

I. C. COHEN, *Assistant Examiner.*